(12) United States Patent
Ghanem

(10) Patent No.: US 11,294,363 B2
(45) Date of Patent: Apr. 5, 2022

(54) SYSTEM AND METHOD FOR POSITIONING WORKPIECE IN A WORKSTATION USING AN AUTOMATIC GUIDED VEHICLE

(71) Applicant: ProcessChamp, LLC, Columbus, OH (US)

(72) Inventor: George K. Ghanem, Columbus, OH (US)

(73) Assignee: ProcessChamp, LLC, Columbus, OH (US)

( * ) Notice: Subject to any disclaimer, the term of this patent is extended or adjusted under 35 U.S.C. 154(b) by 546 days.

(21) Appl. No.: 16/386,606

(22) Filed: Apr. 17, 2019

(65) Prior Publication Data

US 2019/0317486 A1    Oct. 17, 2019

Related U.S. Application Data

(60) Provisional application No. 62/658,817, filed on Apr. 17, 2018.

(51) Int. Cl.
*G05B 19/418* (2006.01)
*B25J 9/16* (2006.01)

(52) U.S. Cl.
CPC ...... *G05B 19/41895* (2013.01); *B25J 9/1697* (2013.01); *G05B 19/4183* (2013.01)

(58) Field of Classification Search
CPC ............ G05B 19/41895; G05B 19/4183
USPC ....................................... 700/112
See application file for complete search history.

(56) References Cited

U.S. PATENT DOCUMENTS

| | | |
|---|---|---|
| 4,430,718 A | 2/1984 | Hendren |
| 4,813,125 A | 3/1989 | Dacey, Jr. |
| 4,827,595 A | 5/1989 | Dacey, Jr. |
| 4,884,431 A | 12/1989 | Dacey, Jr. |
| 4,976,026 A | 12/1990 | Dacey, Jr. |
| 5,010,634 A | 4/1991 | Uemura et al. |
| 5,197,846 A | 3/1993 | Uno et al. |
| 5,239,739 A | 8/1993 | Akeel et al. |
| 5,272,805 A | 12/1993 | Akeel et al. |
| 5,380,978 A | 1/1995 | Pryor |
| 5,910,894 A | 6/1999 | Pryor |

(Continued)

FOREIGN PATENT DOCUMENTS

| | | | |
|---|---|---|---|
| JP | H08-206983 | * | 8/1996 |
| JP | 2002-32107 | * | 1/2002 |
| WO | WO-2007004983 A1 | | 1/2007 |

*Primary Examiner* — Hien D Khuu

(57) ABSTRACT

A method is presented for positioning a workpiece in a workstation. The method includes: transporting a workpiece into a workstation using an automatic guided vehicle, where the workpiece is supported by a workpiece fixture and the workpiece fixture is supported by the automatic guided vehicle; measuring spatial position of the workpiece fixture; removing the workpiece fixture from the automatic guided vehicle using one or more adjustable locators mounted on a frame of the workstation; calculating an adjustment to position of the workpiece fixture between the measured spatial position of the workpiece fixture and a nominal work position; moving the workpiece fixture suing the one or more adjustable locators to the nominal work position according to calculated adjustment; performing an operation on the workpiece while the workpiece fixture remains in the nominal work position; and returning the workpiece fixture to the automatic guided vehicle.

14 Claims, 9 Drawing Sheets

(56) References Cited

U.S. PATENT DOCUMENTS

| | | |
|---|---|---|
| 6,409,435 B1 | 6/2002 | Kocherovsky et al. |
| 6,532,422 B1 | 3/2003 | Elgersma et al. |
| 6,691,392 B2 | 2/2004 | Savoy et al. |
| 6,971,175 B2 | 12/2005 | Savoy et al. |
| 7,143,494 B2 | 12/2006 | Savoy |
| 7,469,473 B2 | 12/2008 | Savoy |
| 7,913,370 B2 | 3/2011 | Savoy |
| 9,068,809 B1 | 6/2015 | Lagally et al. |
| 10,095,214 B2 | 10/2018 | Ghanem |
| 10,101,725 B2 | 10/2018 | Ghanem |
| 2002/0077721 A1 | 6/2002 | Linn et al. |
| 2006/0093205 A1 | 5/2006 | Bryll et al. |
| 2006/0167587 A1 | 7/2006 | Read |
| 2008/0000069 A1 | 1/2008 | Savoy |
| 2009/0019927 A1 | 1/2009 | Tobisawa et al. |
| 2009/0112349 A1 | 4/2009 | Cobb et al. |
| 2010/0253637 A1 | 10/2010 | Lieberman et al. |
| 2012/0041585 A1 | 2/2012 | Mather |
| 2012/0066217 A1 | 3/2012 | Eder |
| 2012/0072021 A1* | 3/2012 | Walser ................ G05B 19/402 700/254 |
| 2012/0152911 A1 | 6/2012 | Diez et al. |
| 2013/0178627 A1 | 7/2013 | Freitas, Jr. et al. |
| 2014/0144895 A1 | 5/2014 | Stork Genannt Wersborg et al. |
| 2015/0014283 A1 | 1/2015 | Peters et al. |
| 2015/0028611 A1 | 1/2015 | Asamizu et al. |
| 2015/0276376 A1 | 10/2015 | Lagally et al. |
| 2015/0316925 A1* | 11/2015 | Frisk ................ G05B 19/41895 700/113 |
| 2018/0093728 A1* | 4/2018 | Mayr ..................... B62D 65/18 |
| 2019/0127000 A1* | 5/2019 | Eberl ..................... G01N 21/84 |

\* cited by examiner

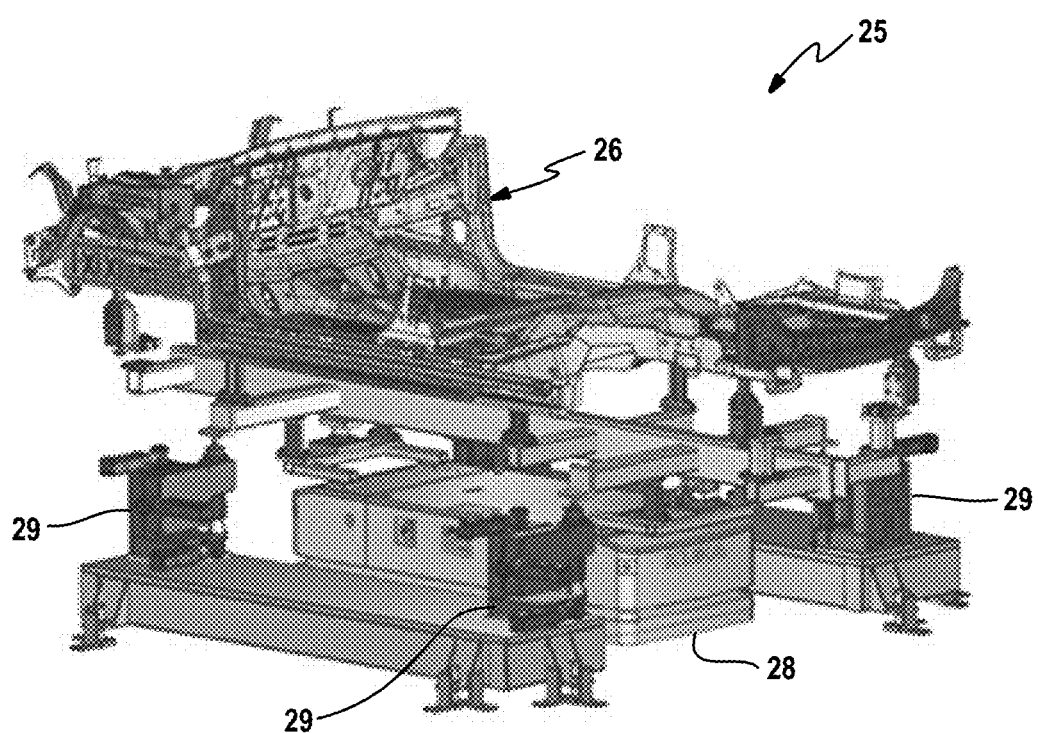
FIG. 2A
FIG. 2B
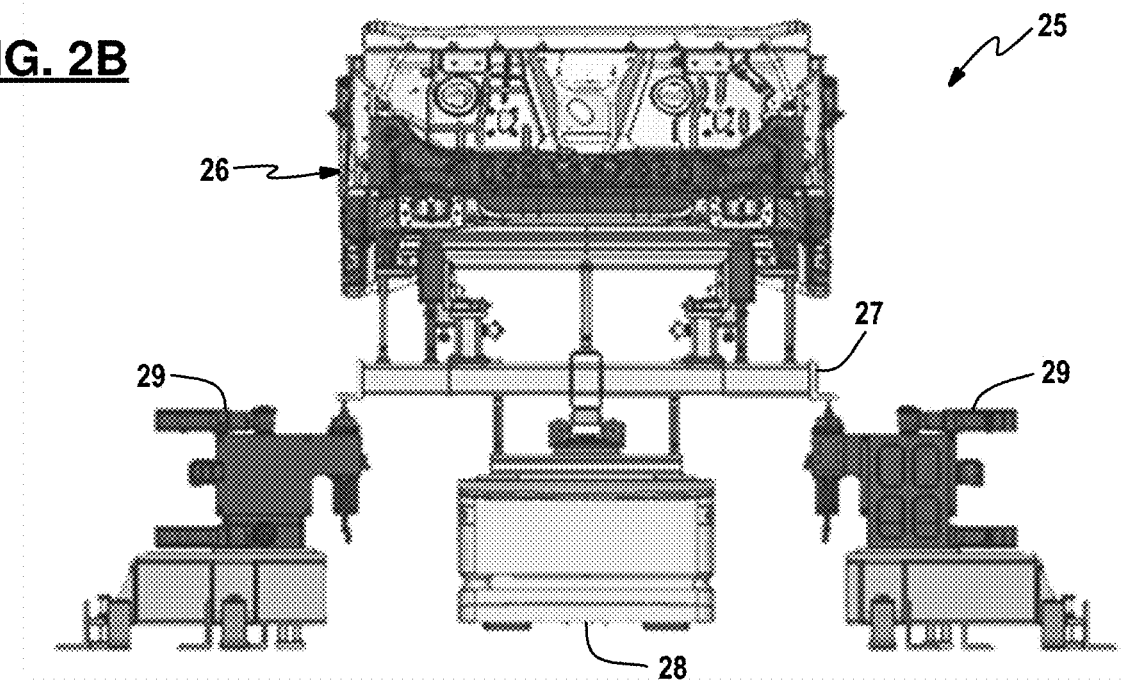

SYSTEM AND METHOD FOR POSITIONING WORKPIECE IN A WORKSTATION USING AN AUTOMATIC GUIDED VEHICLE

CROSS-REFERENCE TO RELATED APPLICATIONS

This application claims the benefit of U.S. Provisional Application No. 62/658,817, filed on Apr. 17, 2018. The entire disclosure of the above application is incorporated herein by reference.

FIELD

The present disclosure relates to a system and method for positioning a workpiece in a workstation using an automatic guided vehicle.

BACKGROUND

It is relatively common in the manufacture of articles, such as automobile bodies, printed circuit boards, and aircraft fuselages, to secure components to fixtures and then to assemble the components together. The fixtures are intended to orient the components relative to one another, in a manner that attempts to position selected features on the components at a nominal position. This practice has significant drawbacks including dimensional variability leading to quality issues, high scrap and a reduced ability to compete in a global market. As an example, variation reduction in the assembly of automotive bodies is a challenging endeavor. A typical automobile body can employ between 100 to 150 sheet metal parts, which can be assembled to one another in a modern, high volume assembly line in 55 to 75 assembly stations. The assembly line can have between 1500 to 2000 fixture locators that are employed to locate various combinations of the components to perform approximately 4000 welds. A single failure that occurs at a locator, a welding spot or from a part that is not fabricated correctly can cause a dimensional variation. This variation will then propagate downstream from station to station and accumulate at the final station of the body assembly. After fabrication/assembly of the body, the vehicle doors, hood, windshield, and trunk lid are then mounted and fit to the body. The dimensional variation is accumulated at the body assembly openings, compounded by variations associated with panels or other subassemblies, and will significantly increase the manufacturing complexity, leading to more tooling failures and unexpected downtime and reduction in both product quality and production throughput. These issues can also cause leaks, noise and risk of water leakage. While there has been much accomplishment in the art of data acquisition using laser sensors and optics, little has been done to utilize the data in real time to impact the dynamic movement of the tooling to reduce variation. Most manufacturing companies continue to rely on human knowledge and analysis to estimate and make tooling corrections (shimming) one locator at a time—after the fact, meaning parts have already been incorrectly joined. It is worth noting that dimensional problems contribute to approximately two thirds of all quality-related problems during new product launches.

One drawback relates to variation in the manufacturing processes for the body components and the inability of the prior art assembly practice to immediately adjust to the particular tolerance/configuration of a body part loaded into a workpiece fixture.

Conventional workpiece fixtures commonly employ locator pins that engage holes in one or more of the body components. As many of the body components are stampings, the diameter of the holes tends to be relatively consistent, but due to variation in the material from which the body components are formed (e.g., chemical composition, micro-structure, thickness of the material) and variation in the processing of the material (e.g., temperature of the stamping die, type/condition of lubrication, amount of lubrication, temperature of workpiece, speed in which the body component is formed), the exact location of these holes tends to move (albeit in a small manner) relative to other features on the body component. It should be appreciated that while the variation is relatively small, the variation of each of the features can compound when the body component is joined to other body components.

Despite the existence of part-to-part variation in a body component, it is common practice in the assembly plants to employ nominal part geometry and/or historic sample data to position a locator relative to a frame of a workpiece fixture and thereafter employ trial-and-error techniques to reposition (i.e., shim) the locator as needed. Moreover, in an attempt to eliminate small positioning errors between the workpiece fixture and the body component (which would further contribute to undesired variation in the joining of the body components together), the locator pins are commonly sized to the largest possible or largest statistically probable diameter of the hole in the body component. Consequently, it is not uncommon for the locator pin to engage the hole in the body component in an interference fit manner. Moreover, it is not uncommon, due to the variation in the positioning of the hole(s) in the body component relative to other features, to have the locator pin offset from the hole in the body component (i.e., the axis of the locator pin is offset from the axis or centerline of the hole in the body component). Accordingly, a relatively large amount of stress can be exerted on the body component and the locator pin as a result of the interference between the locator pin and the hole in the body component, and the offset between the axis of the locator pin and the centerline of the hole in the body component. These stresses induce wear on the locator pins, which can essentially machine the locator pins to a smaller diameter, and can cause the locator pin to fail.

Therefore, it is desirable for an improved method for positioning a workpiece in a workstation which enables more precise manufacturing operations to be performed in relation to the workpiece.

This section provides background information related to the present disclosure which is not necessarily prior art.

SUMMARY

This section provides a general summary of the disclosure, and is not a comprehensive disclosure of its full scope or all of its features.

In one aspect, a method is presented for positioning a workpiece in a workstation. The method includes: transporting a workpiece into a workstation using an automatic guided vehicle, where the workpiece is supported by a workpiece fixture and the workpiece fixture is supported by the automatic guided vehicle; measuring, by machine vision, spatial position of the workpiece fixture; removing the workpiece fixture from the automatic guided vehicle using one or more adjustable locators, where the one or more adjustable locators are mounted on a frame of the workstation and the one or more adjustable locators are movable in more than one degree of freedom in relation to the frame;

calculating an adjustment to position of the workpiece fixture between the measured spatial position of the workpiece fixture and a nominal work position; moving, by the one or more adjustable locators, the workpiece fixture to the nominal work position according to calculated adjustment, where the one or more adjustable locators are driven by respective motors which are controlled by the computer processor; performing an operation on the workpiece while the workpiece fixture remains in the nominal work position; and returning the workpiece fixture to the automatic guided vehicle.

In another aspect, the workpiece is supported by the one or more adjustable locators which are affixed to the automatic guided vehicle. In this case, the workpiece and/or the workpiece fixture does not need to be removed from the automatic guided vehicle. The method includes: transporting a workpiece into a workstation using an automatic guided vehicle, measuring, by machine vision, spatial position of the workpiece; calculating, by a computer processor, an adjustment to position of the workpiece between the measured spatial position of the workpiece and a nominal work position for the workpiece in the workstation; moving, by the one or more adjustable locators, the workpiece to the nominal work position according to calculated adjustment, where the one or more adjustable locators are driven by respective motors which are controlled by the computer processor; and performing an operation on the workpiece while the workpiece remains in the nominal work position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are diagrams depicting an example workstation in which an AGV is used to transport a workpiece;

Corresponding reference numerals indicate corresponding parts throughout the several views of the drawings.

DETAILED DESCRIPTION

Example embodiments will now be described more fully with reference to the accompanying drawings.

Figure 1:
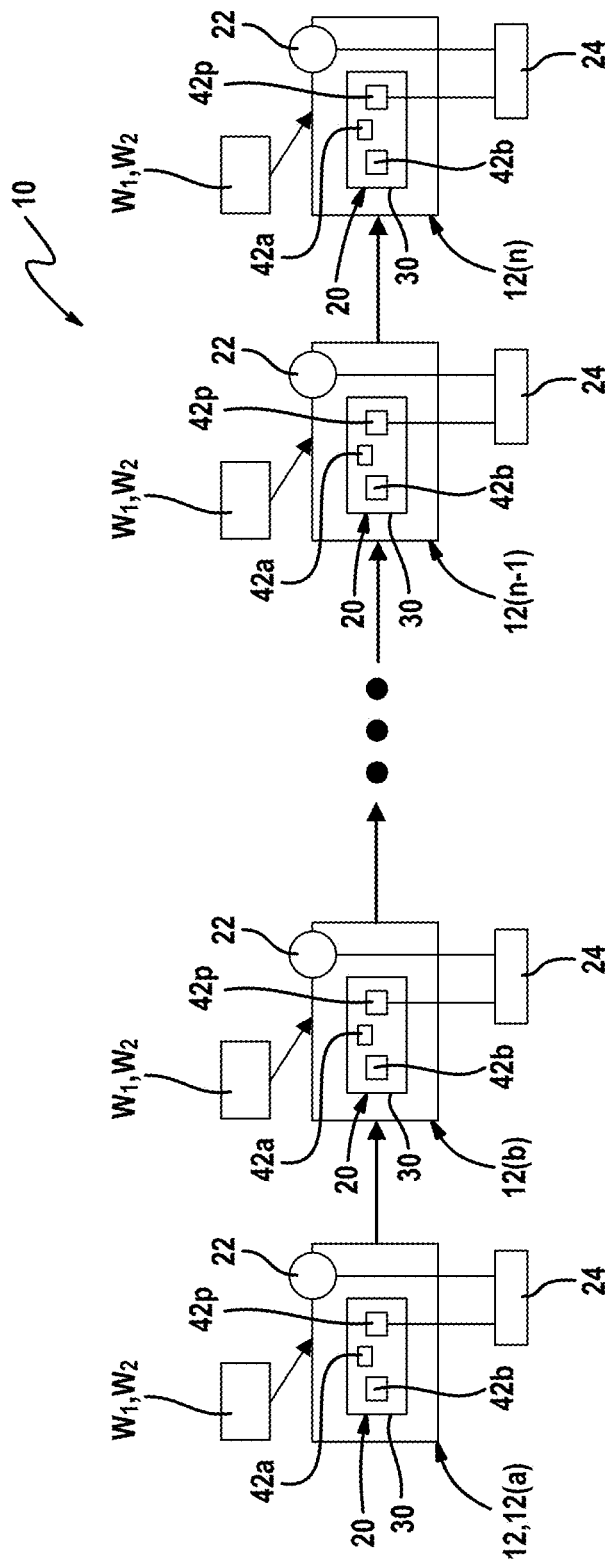
FIG. 1 is a schematic illustration of an exemplary manufacturing system constructed in accordance with the teachings of the present disclosure.

With reference to FIG. 1 of the drawings, an exemplary system for manufacturing an article is generally indicated by reference numeral 10. The manufacturing system 10 can include a plurality of workstations that are employed to form one or more portions of the article from various workpieces. The workstations can be collectively or generally designated by reference numeral 12, or can be referred to specifically by reference numerals 12(a), 12(b), . . . 12(n-1) and 12(n). Each workstation 12 can comprise a positioning mechanism 20, a measuring device 22, and a workstation controller 24. As further described below, calculations for positioning or re-position a workpiece in the workstation can be performed by a computer processor within controller 24 or by an auxiliary computer (not shown in FIG. 1).

The article can comprise one or more workpieces (e.g., W1, W2) which may undergo different manufacturing operations at each of the workstations 12. In one example, the workpieces form a lap joint that is joined or secured by welding, but those of skill in the art will appreciate that each workstation 12 could employ one or more joining techniques, such as welding (e.g., arc-welding, MIG welding, TIG welding, spot welding, resistance welding), bonding, riveting, fastening, nailing, brazing, soldering, etc. Additionally, those of skill in the art will appreciate that the particular joint need not be a lap joint, but could be any type of joint, including a butt joint or a mixed joint. While reference has been made to welding or joining, other types of manufacturing operations including but not limited to machining, force fitting, and parameter optimization are contemplated by this disclosure.

Automatic guided vehicles (AGVs) are typically used for material handling in a manufacturing environment. In some instances, AGVs have been used to bring workpieces to a tool as a replacement for a conveyor system. FIGS. 2A and 2B illustrate an example workstation 25 in which an AGV 28 is used to transport a workpiece 26. In this example, the workpiece 26 is a partially assembled vehicle body. A vehicle body is intended to be illustrative and non-limiting article being manufactured. The workpiece 26 is supported on a workpiece fixture 27 which is in turn supported on an AGV 28. One drawback of this approach is accuracy of stopping positions for AGVs are only ±5-10 mm.

Figure 3:
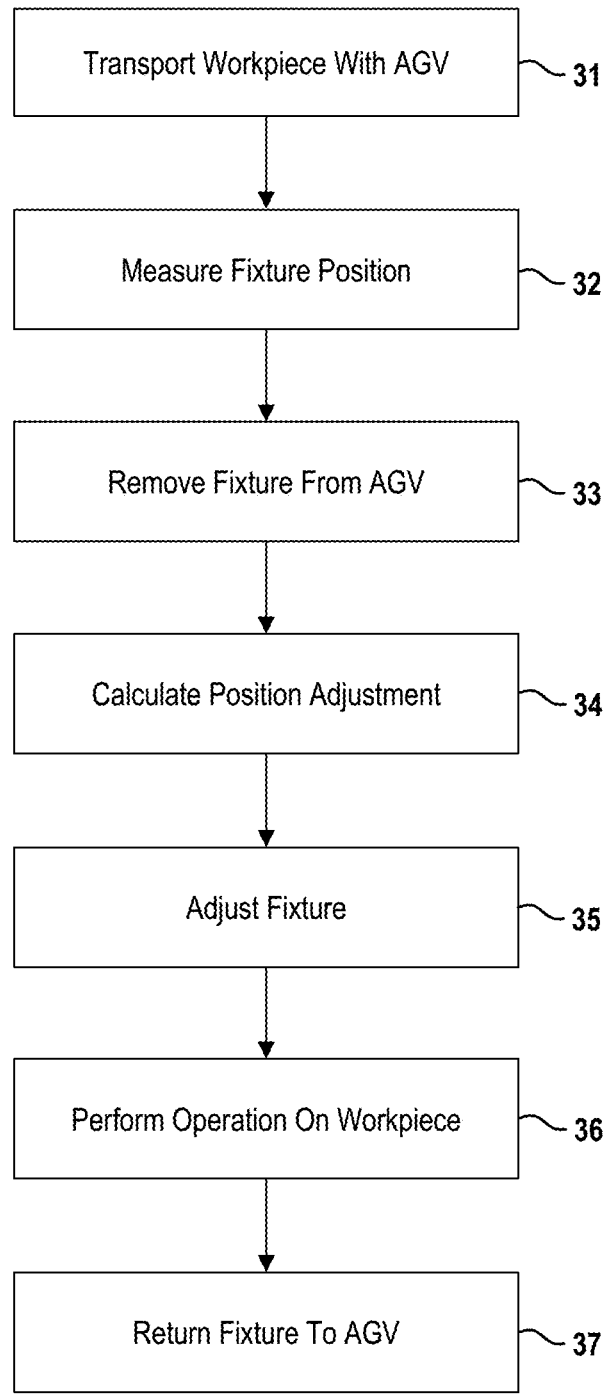
FIG. 3 is a flowchart depicting a method for positioning a workpiece in a workstation.

FIG. 3 illustrates an improved method for positioning a workpiece in a workstation using AGVs. A workpiece is first transported into a workstation using an automatic guided vehicle as indicated at 31. In one example, the workpiece 26 is supported by a workpiece fixture 27 and the workpiece fixture 27 is supported by the automatic guided vehicle (AGV) 28 as seen in FIGS. 2A and 2B. In another example, the workpiece is supported directly by the AGV without an intermediary workpiece fixture.

Once the AGV reaches a designate stopping position within the workstation, the spatial position of the workpiece fixture 27 is then measured at 32 using a measurement device 22. In the example embodiment, the spatial position of the workpiece fixture is measured by machine vision using one or more cameras. Other types of non-contact measurement systems as well as contact measurement system may also be used to measure the spatial position of the workpiece fixture in the workstation.

In an example embodiment, the workstation 12 is equipped with a positioning mechanism 20 for the workpiece fixture 27. For example, the positioning mechanism 20 may include four or more adjustable locators 29 mounted on or associated with a frame of the workstation 12, for example as seen in FIG. 2A. The workpiece fixture 27 is removed from the automatic guided vehicle at 33 using the adjustable locators 29, where each adjustable locator is movable in more than one degree of freedom in relation to the frame of the workstation.

In the context of the example embodiment, the step of removing the workpiece fixture from the AGV is further described. After the AGV drives into the workstation, the measuring device 22 measures the spatial position of the workpiece fixture. Specifically, the measuring device 22 determines the spatial position of the holes configured to receive the pins of the adjustable locators and formed in the flanges of the workpiece fixture. In response to receiving the spatial position from the measuring device 22, the workstation controller 24 determines the xy coordinates for the position of each adjustable locator, such that each adjustable locator aligns concentrically with the holes in the flanges. The workstation controller 24 then drives the respective motors to first move the adjustable locators into alignment with the holes and then move the adjustable locators along the z axis to lift the workpiece fixture off of the AGV. In the event that the AGV is not positioned precisely at its target location within the workstation, these steps enable the positioning mechanism 20 to pick up the workpiece fixture.

After removing the workpiece fixture from the AGV, workpiece fixture will likely need to be moved to a nominal work position. It is understood that the adjustable locators 29 can more precisely position the workpiece fixture in relation to the nominal work position than is achievable by the AGV. The adjustment needed to place the workpiece fixture in the nominal work position is calculated at 34. In some embodiments, the measuring device 22 may re-measure the spatial position of the workpiece or workpiece fixture before calculating the adjustment. In other embodiments, the workstation controller 24 may forego a second measurement and rely upon the known position of the workpiece fixture having just removed it from the AGV. In either case, the workstation controller 24 calculates the positional adjustment need to move the workpiece fixture to the nominal work position.

In one example, an adjustment is calculated between the measured spatial position of the workpiece fixture and a desired nominal work position for the workpiece fixture. In another example, the spatial position of the workpiece itself is measured and an adjustment is calculated between the measured spatial position of the workpiece and the desired work position for the workpiece. Assuming a known spatial relationship between the workpiece and the workpiece fixture, the workpiece fixture can be moved at 35 according to the calculated adjustment for the workpiece. Similarly, in the absence of a workpiece fixture, the measurement and adjustment steps would be for the workpiece itself.

Figure 4A:
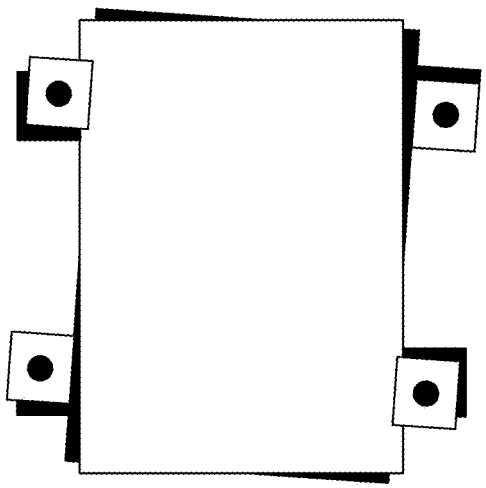
FIGS. 4A and 4B illustrates an offset calculation for adjusting a workpiece fixture.
Figure 4B:
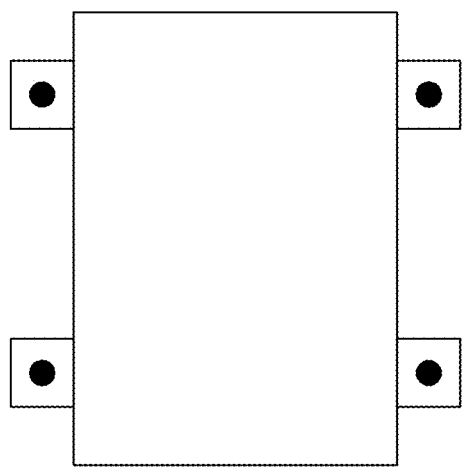

Calculating the adjustment for the workpiece fixture is further described in relation to FIGS. 4A and 4B. Spatial position of two or more features of the workpiece fixture is measured as note above. In the example embodiment, the four flanges of the workpiece fixture serve as the measured features. For each flange, an offset is calculated between the current position of the flange and the desired position of the flange in the nominal work position, where the offset is a vector representing the differential between the two positions in three dimensional space. In other embodiments, it is understood that the features used to position the workpiece fixture can be different than the features engaged by the adjustable locators.

While the workpiece fixture 27 remains in the nominal work position, a manufacturing operation is performed on the workpiece as indicated at 36. In one example, the manufacturing operation is performed using one or more robots residing in the workstation. Once the manufacturing operation is complete, the workpiece fixture is returned to the AGV as indicated at 37. The AGV can then transport the workpiece to the next workstation.

Figure 5A:
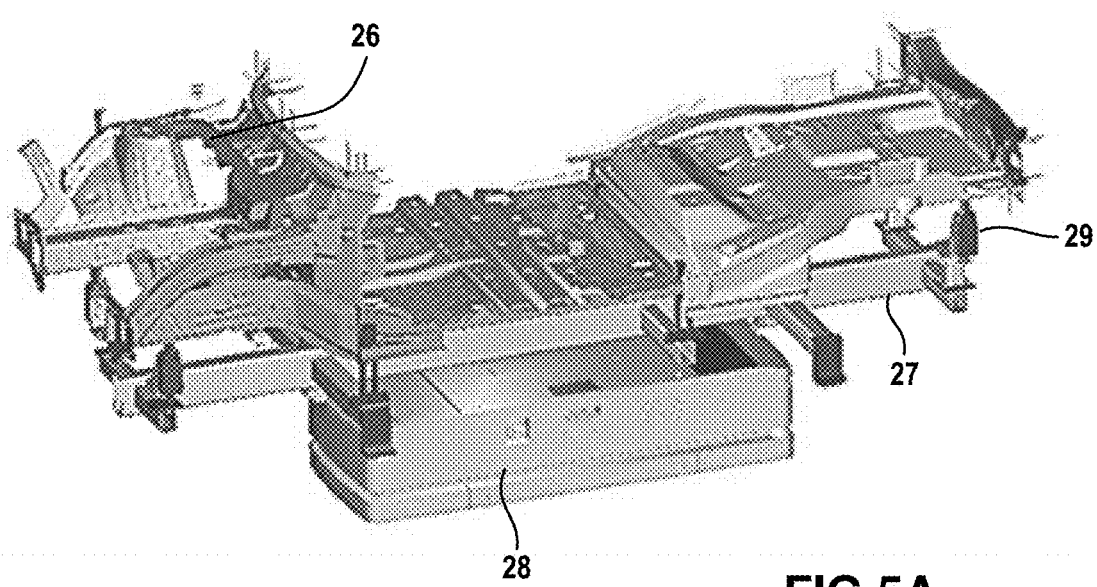
FIGS. 5A and 5B are diagrams depicting another example of a workstation in which an AGV is used to transport a workpiece.
Figure 5B:
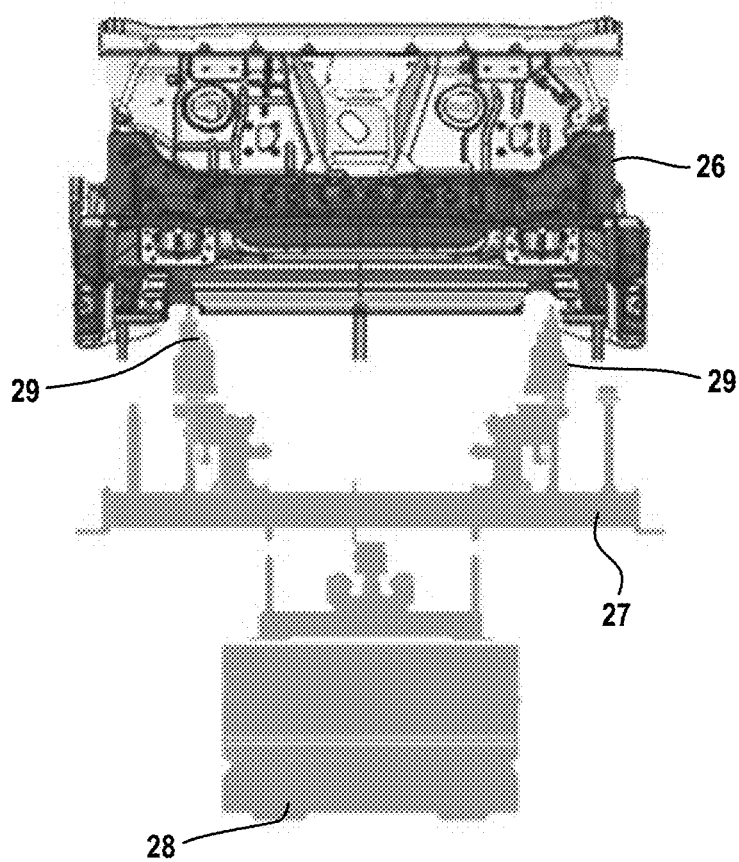

FIGS. 5A and 5B illustrate another example scenario. An AGV 28 is again used to transport a workpiece 26 into a workstation 25. The workpiece is supported on a workpiece fixture 27 which in turn is supported on an AGV 28. In this scenario, the workpiece 26 is engaged by one or more adjustable locators 29 which are affixed to the workpiece fixture 27.

Figure 6:
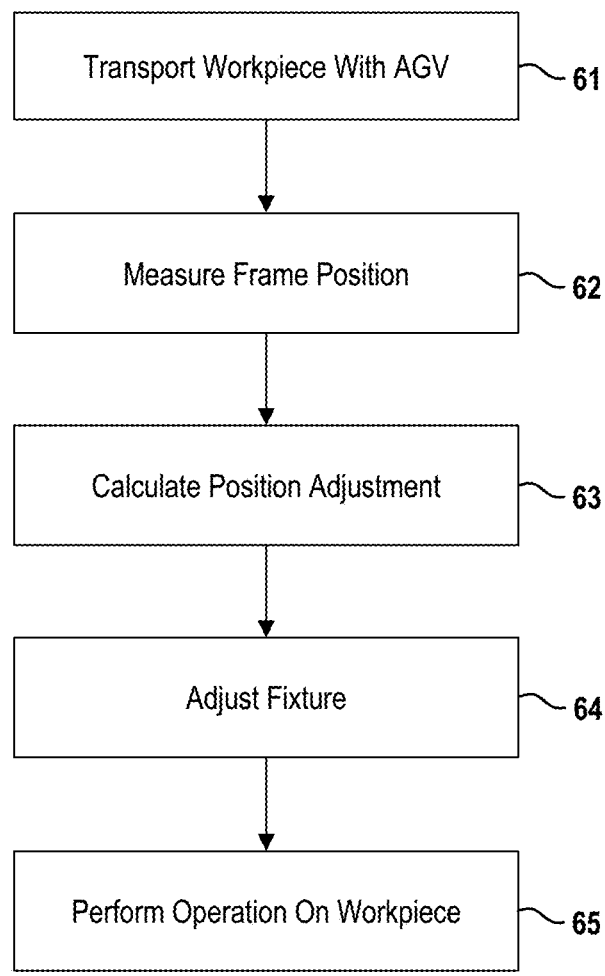
FIG. 6 is a flowchart depicting an alternative method for positioning a workpiece in a workstation.

FIG. 6 depicts the method for positioning a workpiece in this scenario. The workpiece is first transported into a workstation using an automatic guided vehicle as indicated at 61 and the spatial position of the workpiece 26 is measured at 62 in relation to a reference frame of the workstation.

Unlike the first scenario, the workpiece fixture 27 is not removed from the AGV. Rather, the workpiece 26 can be moved from its current position to a nominal work position using the adjustable locators upon which the workpiece rests. To do so, an adjustment is calculated at 63 between the measured spatial position of the workpiece and a desired nominal work position. Specifically, two or more features of the workpiece are measured and, for each feature, an offset is calculated between the current position of the feature and the desired position of the feature in the nominal work position. The workpiece is moved by the adjustable locators to the nominal work position at 64 according the calculated adjustment, where the one or more adjustable locators are driven by respective motors which are controlled by the workstation controller.

While the workpiece 26 remains in the nominal work position, a manufacturing operation is performed on the workpiece as indicated at 65. In one example, the manufacturing operation is performed using one or more robots residing in the workstation. Once the manufacturing operation is complete, the AGV can then transport the workpiece to the next workstation. Except with respect to the differences discussed herein, the steps in this positioning method are substantially the same as described above in relation to FIG. 3.

Figure 7:
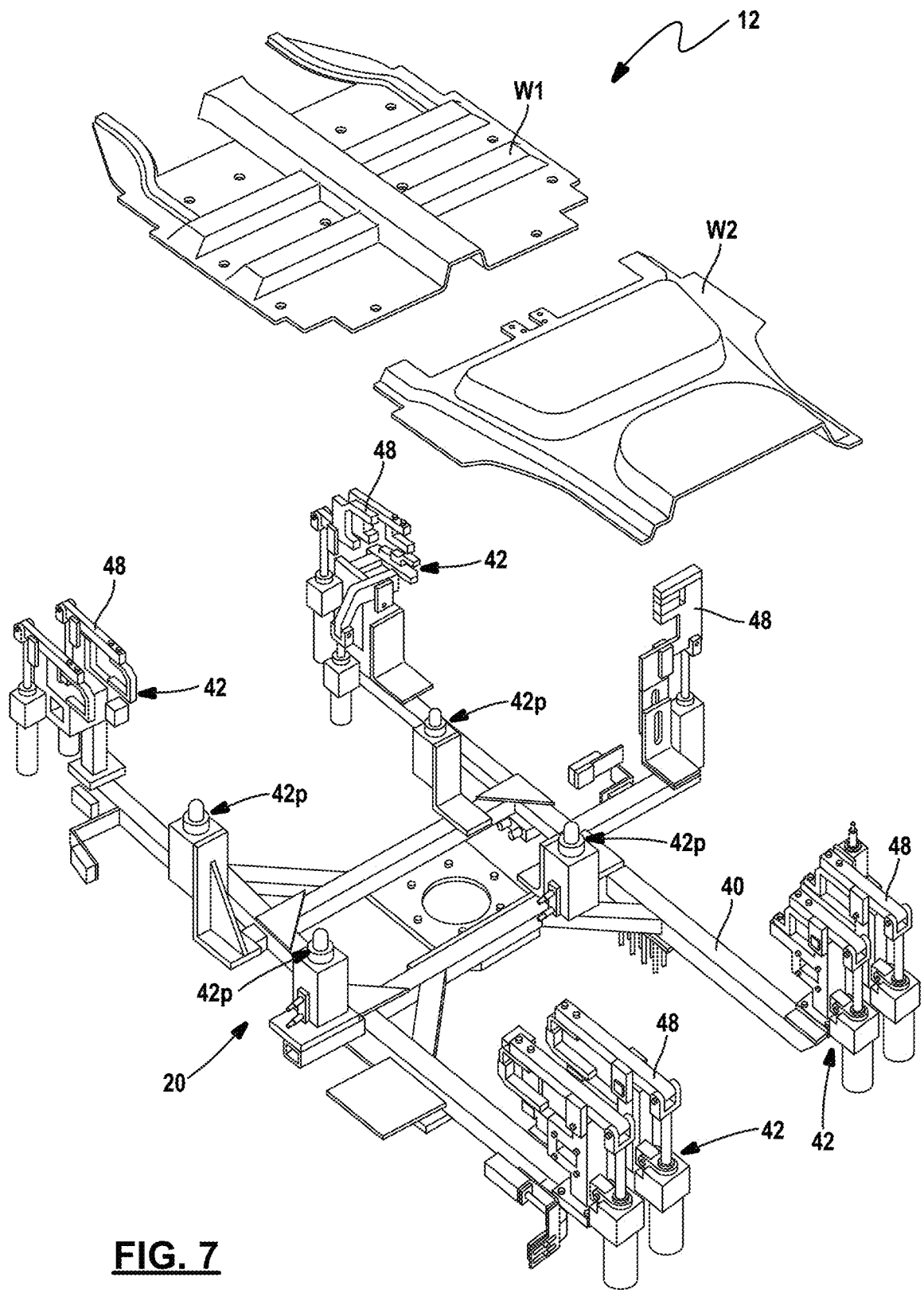
FIG. 7 is a perspective view of a portion of the manufacturing system of FIG. 1, illustrating an exemplary positioning mechanism constructed in accordance with the teachings of the present disclosure.

FIG. 7 further illustrates an example workpiece fixture 27 which may be supported by an AGV as described in relation to FIGS. 5A and 5B. In this example, the workpiece fixture 27 includes four adjustable locators 42P and is configured to hold two workpieces (W1, W2) so that the joining process can be conducted in a workstation. The adjustable locators 42P position the workpieces relative to the frame 40 and each other. In other embodiments, it is envisioned that the adjustable locators 42P could be mounted to the frame of the workstation and configured to support a workpiece fixture as seen in FIGS. 2A and 2B. In this case, the workpiece fixture supports the workpiece and is moved, for example in relation to a nominal work position.

Depending on the configuration of the workpieces that are to be joined in the workstation 12, the locators 42 can be configured in one or more sets. Generally speaking, one set of locators 42 can be employed to locate a first workpiece relative to the frame 40 and another set of locators 42 can be employed to locate a second workpiece relative to the frame 40. It will be understood, however, that one or more of the locators 42 in one set of locators 42 could be employed to position two or more workpieces relative to the frame 40. Likewise, one or more locators 42 in one set of locators could be employed to position the workpiece fixture in relation to the frame. As will be discussed in more detail below, the locators 42 will include at least one primary locator 42p. In some situations, a first workpiece can be positioned in a given workstation with a set of locators having no primary locators 42p, and each workpiece that is to be joined to the first workpiece in the given workstation can be positioned with a set of locators having two primary locators 42p. The locators 42 can be configured to engage one or more of the workpieces in a controlled manner to both locate the workpiece(s) in a desired manner and to eliminate translating movement along and rotational movement about X, Y and Z axes. One technique commonly employed in the design of the positioning mechanism 20 aims to constrain the degrees of freedom of a workpiece during a joining operation to ensure repeatable build. Such system is referred to as the 3-2-1 principal of fixture design. According to this design, the positioning mechanism 20 is configured such that each workpiece or a workpiece fixture:

a) rests on three non-collinear net contact blocks on a bottom surface (i.e., in an X-Y plane), which fixes the location of the workpiece in a first direction along the Z-axis, rotationally about the Y-axis, and in a first rotational direction about the X-axis;

b) rests on a four-way locating pin on a side (X-Z plane), which fixes the motion of the workpiece in both X-Y plane one direction along the X-axis and another around the Y-axis and in a first rotational direction about the Z-axis; and c) rests on one two-way locating pin on an adjacent surface (Y-Z plane) to fix the location of the workpiece in one direction along the Y-axis and in a second rotational direction about the Z-axis. Additionally, it will be appreciated that if the workpiece is not sufficiently rigid, more than three net contact blocks may be employed to reduce or eliminate deformation of the workpiece.

Each locator 42 is disposed at a corresponding one of the points on which the workpiece or workpiece fixture rests. The locators 42 can comprise rest buttons or pads, concentric locators and radial locators. Clamps 48 can be employed to secure the workpiece or the workpiece fixture to the positioning fixture 20 to thereby inhibit translation of the workpiece or the workpiece fixture relative to the positioning fixture 40 along the X, Y and Z-axes, as well as rotationally about the X-axis in a second rotational direction.

If desired, the locators 42 can be movably coupled to the frame 40 so as to be capable of being used for the production of different finished articles. For example, the locators 42 could be positionable in a first orientation to facilitate the joining of workpieces for a first finished article (e.g., the body-in-white of a sedan) and a second orientation to facilitate the joining of workpieces for a second finished article (e.g., the body-in-white of a sport-utility vehicle). The positioning of the locators 42 can be accomplished manually with assistance of results from the optimization algorithm, or preferably in an automated manner via an appropriate mechanism, such as one or more linear motors (not shown). Moreover, in situations where the locators 42 are moved in an automated manner, the positioning of the locators 42 can be controlled on an as-needed basis, so that workpieces for a variety of different finished articles could be processed together through the manufacturing system 10 without the need for significant down-time to re-tool the manufacturing system 10.

Figure 8:
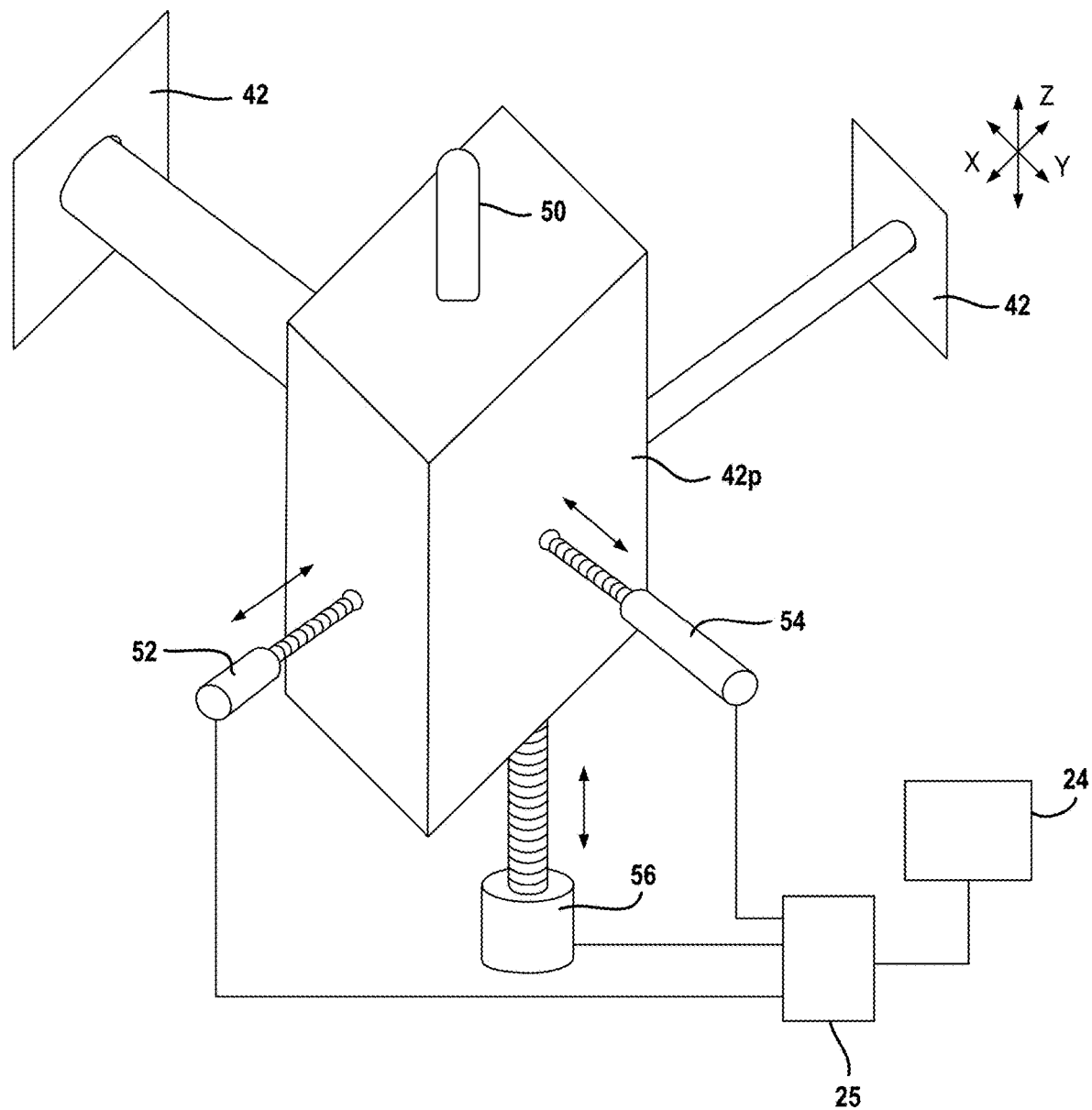
FIG. 8 is a schematic view depicting a portion of the positioning mechanism.
Figure 9:
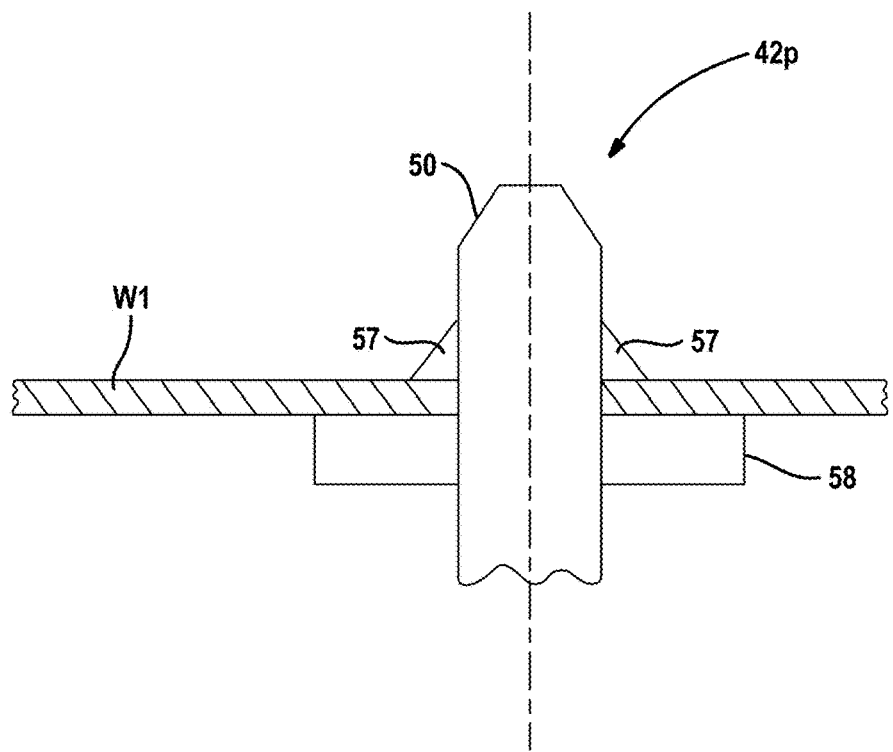
FIG. 9 is a schematic view depicting a portion of the positioning mechanism.

With reference to FIGS. 7 and 8, one or more of the locators 42, which can be a concentric locator or a radial locator, can be a primary locator 42p. In the particular example provided, the primary locator 42p is a concentric locator and comprises a pin 50, as well as first, second and third linear motors 52, 54 and 56, that are driven by controller 24 through associated motor driver and power supply circuitry 25 and configured to translate the pin 50 along the X, Y and Z-axes, respectively, relative to the frame 40. It will be understood that the motor of the first, second and third linear motors 52, 54 and 56 can be coordinated to avoid binding the workpiece or breaking the locators. As is schematically depicted in FIG. 8, the pin 50 can optionally be fixedly coupled the one or more other locators 42 in a given set of locators (i.e., a "first set of locators" in the particular example provided) so that operation of the first, second and third linear motors 52, 54 and 56 can optionally move all or a portion of the locators 42 in the particular set of locators (i.e., as a group) along the X, Y and Z-axes. The first, second, and third linear motors 52, 54 and 56 are depicted as employing jack- or ball-screws in the particular example provided, but it will be appreciated that any type of linear motor could be employed, including those driven by servo and/or stepper motors.

In some situations, the positioning mechanism 20 can be configured to have a quantity of primary locators 42p that is one less than the quantity of workpieces that are to be joined in the workstation 12, and each of the primary locators 42p can be associated with a different set of locators. It will be appreciated, however, that the quantity of primary locators 42p employed in a particular positioning mechanism 20 can be varied as desired. For example, a single primary locator 42p could be employed if movement of one type (e.g., translation along the X, Y and/or Z axes) was desired, while two primary locators 42p could be if more than one type of movement (e.g., translation and rotation) was desired.

It will be appreciated that the purpose of the primary locators 42p is to permit the set of locators 42 that control the positioning of one workpiece or the workpiece fixture to be moved relative to the set of locators 42 that control the positioning of a second workpiece or to the frame. Optionally, as shown in FIG. 6, the primary locator 42p can include a pair of retractable clamping jaws 57 that are movable between a retracted position, which permits an associated workpiece W1 to be loaded onto the primary locator 42p, and an extended position that can be employed to urge the workpiece W1 against a shoulder 58 or rest button to thereby fix the workpiece W1 against the shoulder 58 or rest button to inhibit translation along and rotation of the workpiece W1 about (the pin 50) of the primary locator 32p. Further details regarding adjustable locators and how such locators can be used in manufacturing can be found in U.S. Pat. No. 10,095,214 which are incorporated herein by reference.

Returning to FIG. 1, the measuring device 22 can be any type of device that is configured to collect data in real time relating to the physical positioning of various features on the workpieces when the workpieces are mounted on the positioning mechanism 20 prior to the commencement of a joining operation. For example, the measuring device 22 can comprise a first device, such as a laser radar device or an optical measurement device, which is configured to collect 3-dimensional data relating to the workpieces, and an analyzing tool that can be employed to evaluate the 3-dimensional data and identify the size, shape and relative position of selected features on the workpieces.

In one example embodiment, the measuring device 22 includes a laser (not shown), which can be in the form of a laser tracker (not shown), and initially collects data associated with the Z-axis of the first and second workpieces or a proxy thereof. This data is employed to "flatten" the first and second workpieces relative to a reference plane that is parallel to the X- and Y-axes. The "flattening" could be accomplished by generating an inverse matrix of values (i.e., Z values) along the Z-axis and moving the first and/or second workpieces as necessary to position them in a desired manner relative to the reference plane. Thereafter, the measuring device 22 could be employed to collect full 3-dimensional data that is employed to determine if the several features on the first and second workpieces are in their optimized location.

Performance of the method of the present disclosure in this manner may be beneficial in some situations (e.g., improve the ability of the measuring device 22 to collect full 3-dimensional data by presenting the first and second workpieces in a relatively consistent manner relative to the reference plane, reduce the time to calculate the optimized location(s), and/or reduce the complexity of the calculations used to determine the optimized location(s)).

It will further be appreciated that inspection stations could be employed to acquire 3-dimensional data for the first workpiece, the second workpiece and/or the workpiece fixture prior to their introduction into workstation. In its inspection station, the workpiece can be loaded into a fixture and clamped into place. A laser could be employed to collect Z-axis data used to "flatten" the workpiece as described above. Thereafter, a measuring device could be employed to collect 3-dimensional data of the workpiece.

As an alternative to measuring the workpiece at the workstation in real time, the workpiece can be measured in advance and its measurement data provided to the optimization algorithm when the workpiece is delivered. For example, the workpiece can be associated with a unique serial number that permits it to be associated with a data set that includes its 3-dimensional data. Alternatively, a read-write device, such as a radio frequency tag, can be coupled to the workpiece or a fixture/rack into which the workpiece is mounted and the 3-dimensional data for the workpiece can be written or saved to the read-write device. Data on the read-write device can be accessed from the read-write device when the workpiece or fixture/rack is sequenced into the assembly process.

The ability to gather 3-dimensional data on workpieces prior to placement of the workpieces in the assembly station a) permits non-conforming workpieces to be identified (and potentially removed or repaired) prior to entering the assembly workstation, and/or b) has the potential to reduce the complexity of the 3-dimensional data acquisition in the assembly workstation (because the 3-dimensional data of the workpiece is already known, only three points on the workpiece are needed to understand the orientation of the workpiece in the assembly workstation).

It will be appreciated that the "inspection" function could be performed at a separate station that feeds the workpieces to an assembly station, or could be performed at a location that is remote from the assembly line. For example, if the assembly line/assembly workstation is disposed in an assembly plant of an automobile manufacturer, the inspection station for the workpiece could be located at the facility of a supplier that manufactures the workpiece for the automobile manufacturer.

In the particular example provided, the analyzing tool employs data from the measurement device in conjunction with data transformation techniques and pattern recognition techniques to identify one or more of the selected features. Each of the features can comprise a surface or edge of a workpiece, a datum on a workpiece, a hole or slot in a workpiece, a hole or slot in the workpiece fixture etc. and is selected for its ability to influence variation in the finished article. In the particular example provided, the analyzing tool is employed to a) determine the magnitude of variances between actual feature dimensions (size, location, etc.) and associated nominal feature dimensions (as determined from blueprints or CAD data), b) determine if any of the actual feature dimensions is out of tolerance, and c) statistically analyze the magnitude of the variances to determine if the actual feature dimensions are in statistical control or out of statistical control. The statistical analysis can be employed to identify instances where one or more features are being manufactured in a non-ideal manner so that corrective action can be implemented to ensure that workpieces subsequently fed into the manufacturing system 10 are less apt to add significant variation into the finished article. It will be appreciated that the non-ideal manner of manufacture could be the manufacture of the feature in an out-of-tolerance manner, or could be the positioning or forming of the feature at a position or to a size that deviates from its nominal blueprint location or size.

Optionally, the measuring device 22 can be employed to identify features and/or components of the workpiece(s) and/or assembly that can be out-of-tolerance or otherwise non-conforming (e.g., incomplete or improperly assembled/fabricated) and generate an appropriate response, such as an alarm, flag or shut-down command, which can be used to prevent the out-of-tolerance/non-conforming workpiece or assembly from being used.

The workstation controller 24, or an auxiliary computer (not shown in FIG. 1) communicating with the controller 24, can receive data and information from the measuring device 22 and can employ the optimization algorithm to reorient workpiece fixture relative to a nominal work position. In this regard, the results of the optimization algorithm can be employed to operate the first, second and third linear motors 52, 54 and 56 (FIG. 8) to move one or more of the locators 42 in a desired manner.

The system described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for positioning a workpiece in a workstation, comprising: transporting the workpiece into the workstation using an automatic guided vehicle, where the workpiece is supported by a workpiece fixture and the workpiece fixture is supported by the automatic guided vehicle; measuring, by machine vision, spatial position of the workpiece fixture; removing the workpiece fixture from the automatic guided vehicle using one or more adjustable locators, where the one or more adjustable locators are mounted on a frame of the workstation and the one or more adjustable locators are movable in more than one degree of freedom in relation to the frame; calculating, by a computer processor, an adjustment to position of the workpiece fixture between the measured spatial position of the workpiece fixture and a nominal work position; moving, by the one or more adjustable locators, the workpiece fixture to the nominal work position according to the calculated adjustment, where the one or more adjustable locators are driven by respective motors which are controlled by the computer processor; performing an operation on the workpiece while the workpiece fixture remains in the nominal work position; and returning the workpiece fixture to the automatic guided vehicle.

2. The method of claim 1 wherein the measuring spatial position of the workpiece fixture further comprising using a camera.

3. The method of claim 1 wherein the calculating an adjustment to the position of the workpiece fixture further comprises measuring spatial position of at least two features on the workpiece fixture; and, for each of the at least two feature, determining a difference between spatial position of the feature and location of the feature in the nominal work position.

4. The method of claim 3 further comprises translating the determined difference between the spatial position of the feature and the location of the feature in the nominal work position to a positional adjustment for each of the one or more adjustable locators.

5. The method of claim 1 wherein the workpiece fixture includes a set of flanges and the one or more adjustable locators each include a pin which engages a hole formed in a flange of the workpiece fixture.

6. The method of claim 1 wherein the performing the operation on the workpiece further comprising using one or more robots residing at the workstation.

7. The method of claim 1 wherein the workpiece is further defined as a vehicle body or a portion thereof.

8. A method for positioning a workpiece in a workstation, comprising: transporting the workpiece into the workstation using an automatic guided vehicle, where the workpiece is supported by one or more adjustable locators affixed to the automatic guided vehicle and the one or more adjustable locators are movable in more than one degree of freedom in relation to the automatic guided vehicle; measuring, by machine vision, spatial position of the workpiece; calculating, by a computer processor, an adjustment to position of the workpiece between the measured spatial position of the workpiece and a nominal work position for the workpiece in the workstation; moving, by the one or more adjustable locators, the workpiece to the nominal work position according to the calculated adjustment, where the one or more adjustable locators are driven by respective motors which are controlled by the computer processor; and performing an operation on the workpiece while the workpiece remains in the nominal work position.

9. The method of claim 8 wherein the measuring spatial position of the workpiece further comprising using a camera.

10. The method of claim 8 wherein the calculating an adjustment to the position of the workpiece further comprises measuring spatial position of at least two features on the workpiece; and, for each of the at least two feature, determining a difference between spatial position of the feature and location of the feature in the nominal work position.

11. The method of claim 10 further comprises translating the determined difference between the spatial position of the feature and the location of the feature in the nominal work position to a positional adjustment for each of the one or more adjustable locators.

12. The method of claim 8 wherein the performing the operation on the workpiece further comprising using one or more robots residing at the workstation.

13. The method of claim 8 wherein the workpiece is further defined as a vehicle body or a portion thereof.

14. A manufacturing system, comprising: one or more adjustable locators are mounted on a frame of a workstation, the one or more adjustable locators are movable by respective motors in more than one degree of freedom in relation to the frame; an automatic guided vehicle having a workpiece fixture configured to support a workpiece, the automatic guided vehicle configured to transport the workpiece into the workstation; a machine vision system associated with the workstation and configured to measure spatial position of the workpiece fixture when the automatic guided vehicle is positioned in the workstation; a computer processor in data communication with the machine vision system and the one or more adjustable locators, the computer processor is configured to receive the measured spatial position of the workpiece fixture from the machine vision system and operates to calculate an adjustment to position of the workpiece fixture between the measured spatial position of the workpiece fixture and a nominal work position and control the one or more adjustable locators according to the calculated adjustment to move the workpiece fixture to the nominal work position.

* * * * *